United States Patent
Joshi et al.

(10) Patent No.: US 10,621,101 B2
(45) Date of Patent: Apr. 14, 2020

(54) MECHANISM TO FREE UP THE OVERLAY OF A FILE-BASED WRITE FILTER

(71) Applicant: Wyse Technology L.L.C., Santa Clara, CA (US)

(72) Inventors: Salil S Joshi, Fremont, CA (US); Puneet Kaushik, Fremont, CA (US)

(73) Assignee: Wyse Technology L.L.C., Santa Clara, CA (US)

(*) Notice: Subject to any disclaimer, the term of this patent is extended or adjusted under 35 U.S.C. 154(b) by 257 days.

(21) Appl. No.: 15/422,012

(22) Filed: Feb. 1, 2017

(65) Prior Publication Data
US 2018/0217940 A1   Aug. 2, 2018

(51) Int. Cl.
| G06F 12/00 | (2006.01) |
| G06F 12/0875 | (2016.01) |
| G06F 12/06 | (2006.01) |
| G06F 21/78 | (2013.01) |
| G06F 21/74 | (2013.01) |
| G06F 12/12 | (2016.01) |

(52) U.S. Cl.
CPC ...... *G06F 12/0875* (2013.01); *G06F 12/0638* (2013.01); *G06F 21/74* (2013.01); *G06F 21/78* (2013.01); *G06F 12/12* (2013.01)

(58) Field of Classification Search
None
See application file for complete search history.

(56) References Cited

U.S. PATENT DOCUMENTS

| 2007/0186070 A1* | 8/2007 | Federa | G06F 12/1425 711/163 |
| 2009/0210615 A1* | 8/2009 | Struk | G06F 12/123 711/104 |
| 2013/0173744 A1* | 7/2013 | Xinglong | G06F 3/0617 709/217 |

* cited by examiner

*Primary Examiner* — Baboucarr Faal
(74) *Attorney, Agent, or Firm* — Kirton McConkie; Brian Tucker

(57) ABSTRACT

An overlay of a file-based write filter can be freed up to thereby minimize the likelihood that the overlay will become full and force a system reboot. An overlay-managing write filter can be employed in conjunction with the file-based write filter to monitor files that are stored in the overlay and move files that are not currently being accessed. If a request is made to access a moved file, the overlay-managing write filter can modify the request so that it targets the location of the moved file rather than the location of the original file on the protected volume. In this way, the fact that modified files are being moved from the overlay but not discarded can be hidden from the file-based write filter. As a result, the effective size of the overlay will be increased while still allowing the file-based write filter to function in a normal fashion.

20 Claims, 10 Drawing Sheets

MECHANISM TO FREE UP THE OVERLAY OF A FILE-BASED WRITE FILTER

CROSS-REFERENCE TO RELATED APPLICATIONS

N/A

BACKGROUND

The Windows Embedded operating system includes functionality that can prevent the content of a storage medium from being changed. In a typical example, it may be desirable to prevent the operating system image, which may be stored on a particular disk partition or on flash media, from being changed at runtime. To accomplish this, Windows Embedded provides a file-based write filter which operates at the file level and a block-based write filter (or enhanced write filter) that operates at the block level to redirect all writes that target a protected volume to a RAM or disk cache called an overlay. This overlay stores changes made to the operating system at runtime but is removed when the device is restarted thereby restoring the device to its original state.

FIG. 1 illustrates how a file-based write filter 110 can be employed to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, file-based write filter 110 is positioned at the top of the driver stack and will therefore be able to process an IRP prior to the IRP being passed down to the lower level drivers. File-based write filter 110 can be configured to detect writes targeting a protected volume and redirect them to overlay 140 rather than allowing them to be passed down the driver stack. As a result, the write will actually occur in overlay 140 rather than to disk 100. File-based write filter 110 can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay.

The size of the overlay employed by the Windows file-based write filter is static and cannot be changed without rebooting. In particular, the FbwfSetCacheThreshold function allows the size of the overlay, in megabytes, to be specified. However, when this function is called, it has no effect on the size of the overlay during the current session. Instead, the specified size of the overlay will not be applied until the next session. By default, the size of the overlay will be 64 megabytes and can be increased up to the value of FBWF_MAX_CACHE_THRESHOLD.

One problem that results from the static size of the overlay is that the system will be automatically rebooted if the overlay becomes full. Over time, even if the size of the overlay is set to FBWF_MAX_CACHE_THRESHOLD, it is likely to become full and force the reboot of the system. As a result, the user experience can be greatly degraded when a file-based write filter is employed.

BRIEF SUMMARY

The present invention extends to methods, systems, and computer program products for freeing up the overlay of a file-based write filter to thereby minimize the likelihood that the overlay will become full and force a system reboot. An overlay-managing write filter can be employed in conjunction with the file-based write filter to monitor files that are stored in the overlay and move files that are not currently being accessed to thereby minimize the size of the overlay. If a request is made to access a moved file, the overlay-managing write filter can modify the request so that it targets the location of the moved file rather than the location of the original file on the protected volume. In this way, the fact that modified files are being moved from the overlay but not discarded can be hidden from the file-based write filter. As a result, the effective size of the overlay will be increased while still allowing the file-based write filter to function in a normal fashion.

In one embodiment, the present invention is implemented as a method for freeing up an overlay of a file-based write filter. It is determined that an artifact in the overlay is not currently being accessed. The artifact is then copied to an overlay cache and the artifact is caused to be removed from the overlay. Requests to access the artifact can then be redirected to the overlay cache.

In another embodiment, the present invention is implemented as computer storage media storing computer-executable instructions which when executed implement an overlay-managing write filter that is configured to be loaded in a device stack pertaining to a volume above a file-based write filter that protects artifacts of the volume. The overlay-managing write filter is further configured to: identify artifacts stored in an overlay of the file-based write filter that are not currently being accessed; copy the artifacts that are not currently being accessed to an overlay cache; and cause the artifacts that are copied to the overlay cache to be discarded from the overlay.

In another embodiment, the present invention is implemented by an overlay-managing write filter as a method for managing an overlay of a file-based write filter. The overlay-managing write filter can determine that there are no open handles to an artifact that is stored in the overlay. In response, the overlay-managing write filter can copy the artifact to an overlay cache and call a function of the file-based write filter to cause the artifact to be discarded from the overlay. The overlay-managing write filter can then redirect subsequent requests to access the artifact to the overlay cache.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "artifact" should be construed as encompassing files, directories, registry entries, or any other structure of a file system that can be modified via an I/O request. A "file-based write filter" should be construed as the File-based Write Filter (FBWF) that is included in the Windows Embedded operating system, any equivalent write filter that may be provided in future releases of Windows, or any write filter that performs equivalent functionality in other operating systems (i.e., redirecting writes targeting a protected volume to a separate, and possibly temporary, storage location). A "protected volume" should be construed as a volume storing artifacts that a file-based write filter protects from modification.

Figure 1:
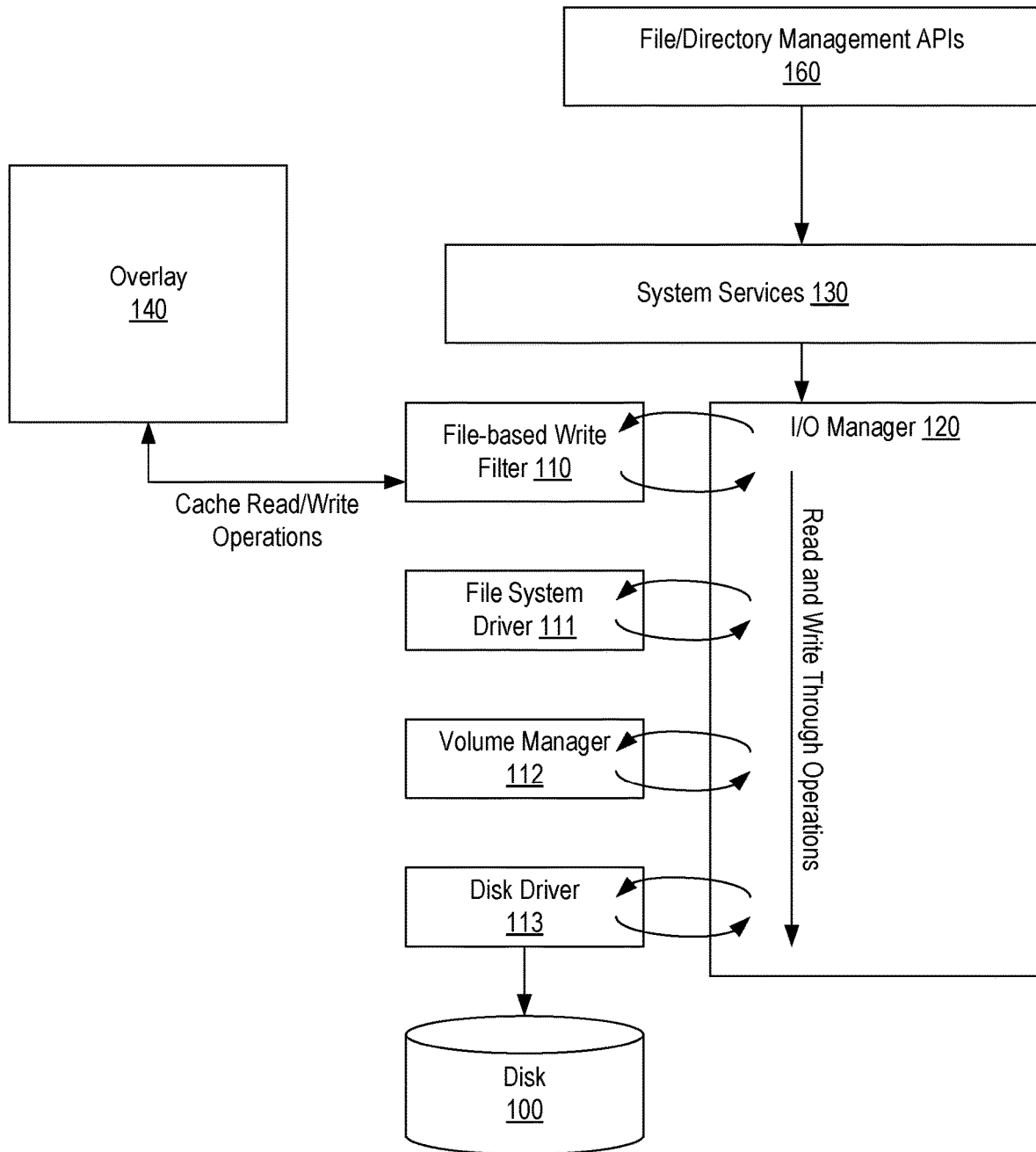
FIG. 1 illustrates a Windows-based I/O system in which a file-based write filter is employed to redirect writes targeting a protected volume to an overlay.
Figure 2:
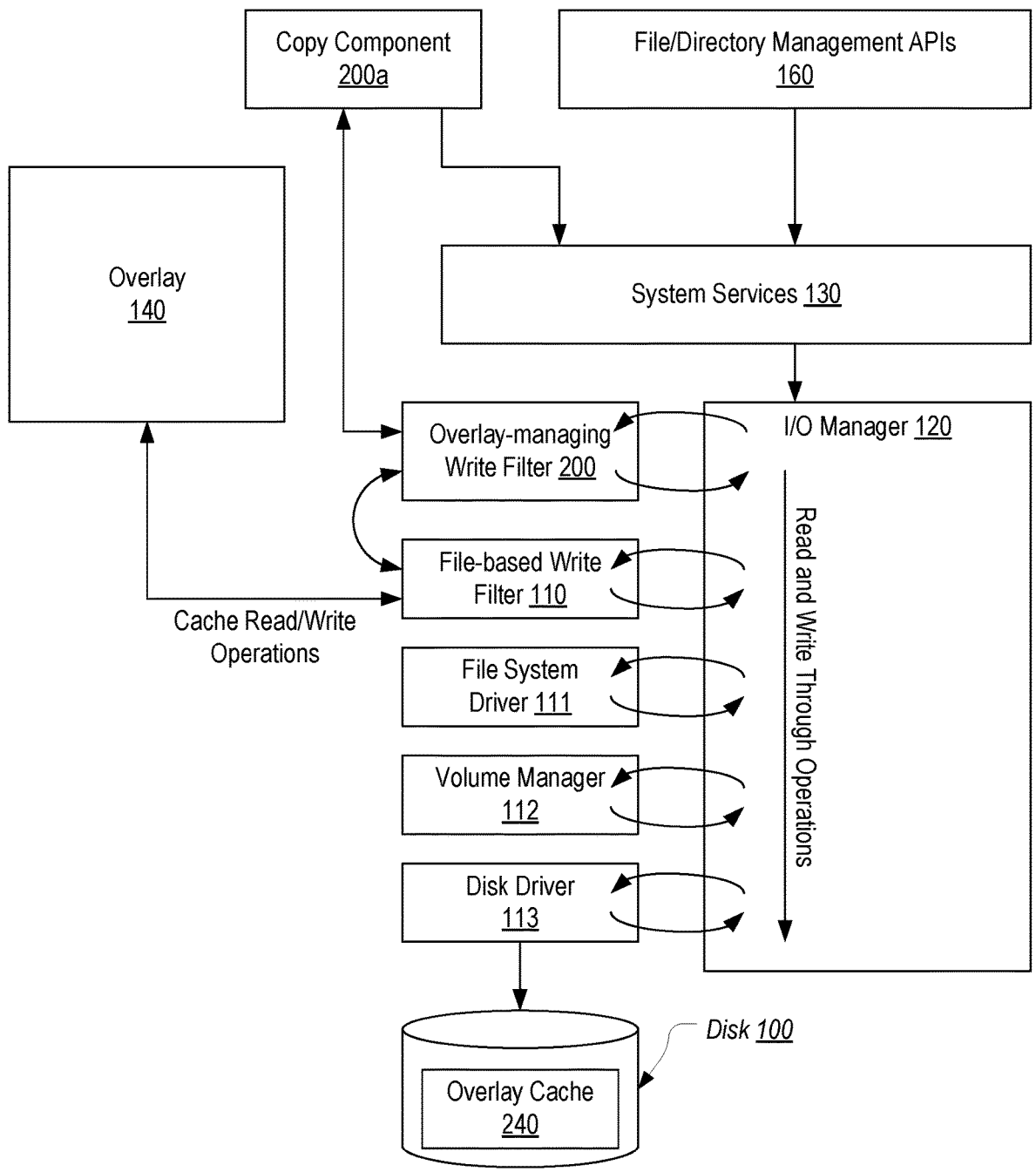
FIG. 2 illustrates how an overlay-managing write filter can be employed in conjunction with the file-based write filter of FIG. 1 to free up the overlay.

FIG. 2 is based on FIG. 1 and illustrates how an overlay-managing write filter 200 can be used in conjunction with file-based write filter 110 to manage artifacts that are stored in overlay 140. More particularly, overlay-managing write filter 200 can monitor which artifacts in overlay 140 are not currently being accessed and can move them to an overlay cache 240 in the protected volume on disk 100. In some embodiments, this moving of artifacts can be carried out by employing a copy component 200a of overlay-managing write filter 200 that may preferably run in user mode. After moving an artifact to overlay cache 240, overlay-managing write filter 200 can cause the artifact to be discarded from overlay 140 thereby reducing the size of overlay 140 to prevent overlay 140 from becoming full. To ensure that the modifications that were made to the artifact are not lost, overlay-managing write filter 200 can monitor I/O requests to allow it to intercept a request to access an artifact that has been moved to overlay cache 240 and cause the request to be redirected to overlay cache 240. In this way, the fact that overlay-managing write filter 200 moves artifacts to overlay cache 240 will be hidden from file-based write filter 110.

In some embodiments, overlay cache 240 can comprise a portion (e.g. one or more folders) of a protected volume that has been registered as an exclusion with file-based write filter 110. In such cases, file-based write filter 110 will not block write requests to overlay cache 240, or in other words, overlay-managing write filter 200 will be able to copy artifacts from overlay 140 to overlay cache 240. Although any suitable mechanism for moving an artifact from overlay 140 to overlay cache 240 may be employed, in some embodiments, overlay-managing write filter 200 may employ copy component 200a to perform a copy of the artifact in overlay 140 to overlay cache 240. An example of this process will be provided below.

As represented by the arrow between the two filters, overlay-managing write filter 200 can be configured to employ functions of file-based write filter 110 (e.g., functions of the FBWF API provided as part of the Windows Embedded OS) to accomplish various tasks such as identifying which artifacts in overlay 140 are not currently being accessed and instructing file-base write filter 110 to discard an artifact from overlay 140. Examples of these tasks will be provided below.

Figure 3:
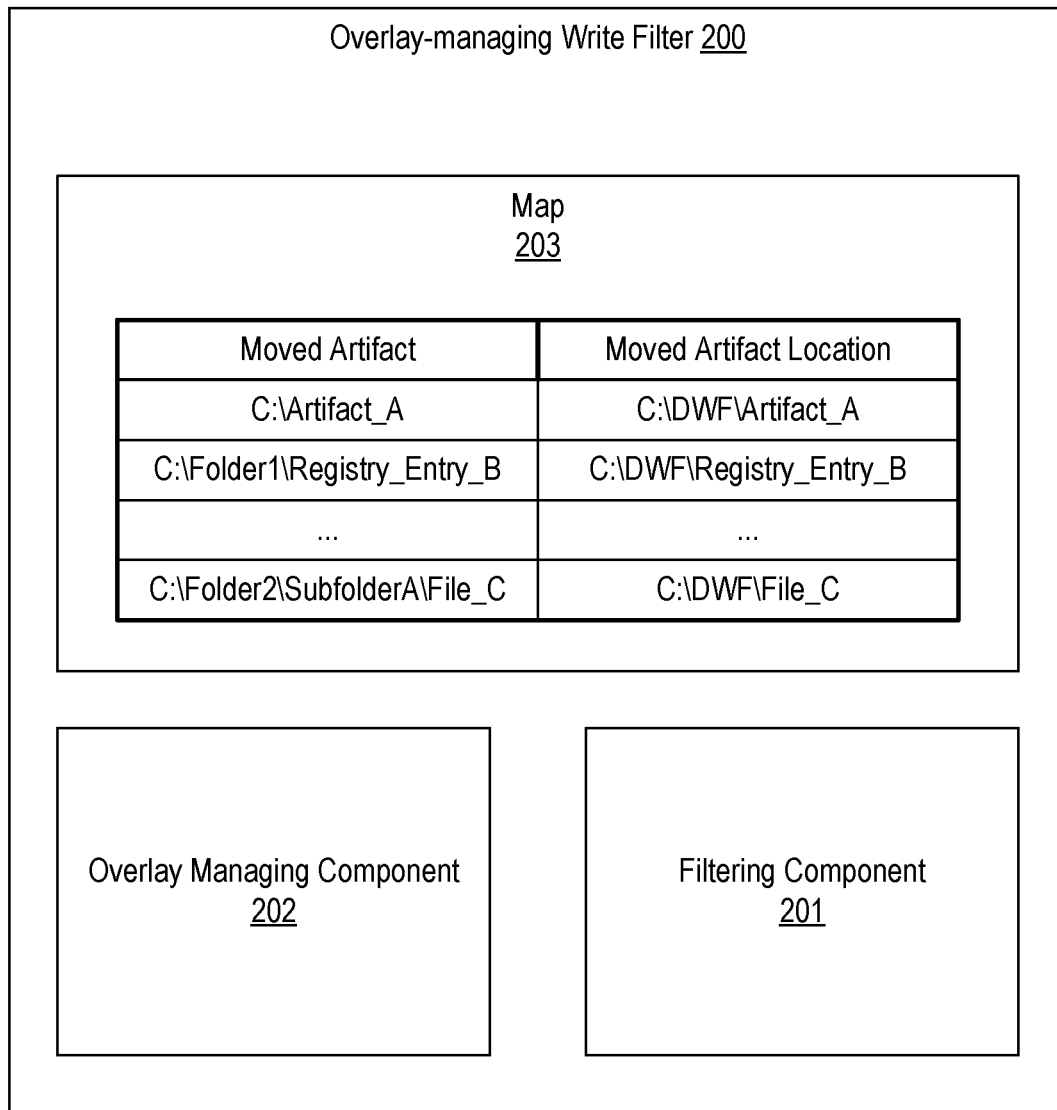
FIG. 3 illustrates various example components of an overlay-managing write filter.

FIG. 3 provides an example of various components of overlay-managing write filter 200. As shown, overlay-managing write filter 200 can include a filtering component 201 and an overlay managing component 202. Filtering component 201 can generally represent the portion of overlay-managing write filter 200 that functions as a filter driver in the device stack for disk 100 (or, more specifically, in the stack for the protected volume). Accordingly, filtering component 201 can be configured to process IRPs that target artifacts on the protected volume. Importantly, because overlay-managing write filter 200 is positioned above file-based write filter 110, filtering component 201 will be able to process these IRPs before they are handled by file-based write filter 110.

Overlay managing component 202 can generally represent the portion of overlay-managing write filter 200 that is configured to interface with file-based write filter 110 and possibly copy component 200a for the purpose of managing which artifacts are moved from overlay 140 to overlay cache 240 and for ensuring that subsequent requests to access a moved artifact can be handled in the proper manner (e.g., by identifying and modifying requests that target a moved artifact so that the moved artifact (which would be the modified version of the artifact) will be accessed from overlay cache 240 rather than from its permanent location on disk 100). The distinction between filtering component 201 and overlay managing component 202 is for illustrative purposes only and any suitable configuration of the functionality of overlay-managing write filter 200 may be employed. Also, a general reference to overlay-managing write filter 200 should be construed as including copy component 200a.

As shown in FIG. 3, overlay-managing write filter 200 can also maintain a map 203 which identifies which artifacts have been moved to overlay cache 240 as well as the specific location in overlay cache 240 where these moved artifacts are stored. Overlay managing component 202 can be configured to update and maintain map 203 based on which artifacts are moved to overlay cache 240. Overlay managing component 202 and/or filtering component 201 may also employ map 203 to properly redirect an I/O request that targets a moved artifact.

FIGS. 4A-4G illustrate an example sequence of steps that can be performed by overlay-managing write filter 200 to free up overlay 140. For ease of illustration, these figures will only include some of the components shown in FIG. 2. However, it can be assumed that the depicted sequence of steps is performed in a computing environment that resembles FIG. 2.

Figure 4A:
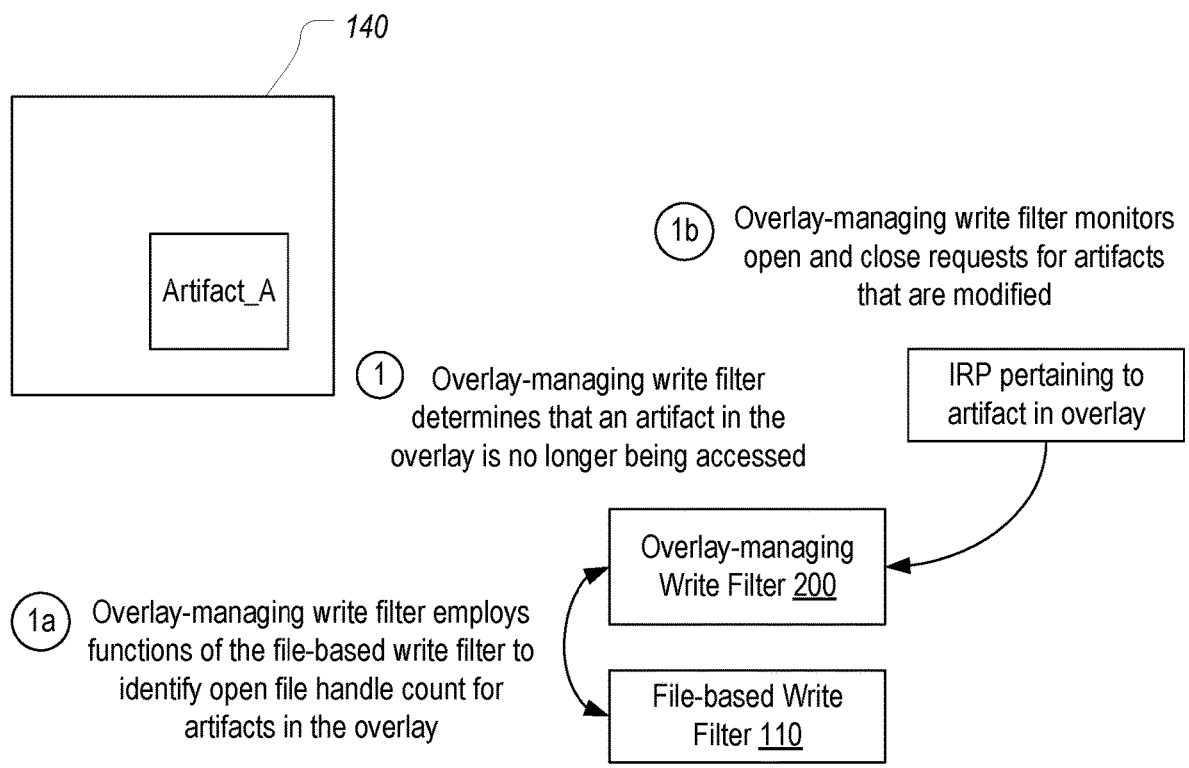
FIGS. 4A-4F illustrate how an overlay-managing write filter can free up the overlay of file-based write filter.

In step 1 which is depicted in FIG. 4A, overlay-managing write filter 200 determines that an artifact in overlay 140 is no longer being accessed. For purposes of this example, it will be assumed that Artifact_A has been stored in overlay 140 (i.e., Artifact_A has been modified) and that overlay-managing write filter 200 has determined that Artifact_A is no longer being accessed. There are a number of different ways in which overlay-managing write filter 200 can accomplish this. For example, step 1a depicts a case where overlay-managing write filter 200 employs functions of file-based write filter 110 to obtain an open file handle count for artifacts stored in overlay 140. In accordance with the current implementation of the FBWF API, overlay-managing write filter 200 may periodically call the FbwfFindFirst and FbwfFindNext functions to retrieve information about each artifact in overlay 140. More specifically, with each call to FbwfFindFirst and FbwfFindNext, overlay-managing write filter 200 can examine the value of the openHandleCount member that is returned in the FbwfCacheDetail structure. If the value of the openHandleCount member is 0, overlay-managing write filter 200 can determine that the artifact identified in the filename member of the FbwfCacheDetail structure is no longer being accessed.

The use of these functions of the FBWF API may result in substantial overhead and may be undesirable in many implementations. Therefore, in some embodiments and as represented in step 1b, overlay-managing write filter 200 may monitor open and close requests (e.g., IRPs) pertaining to artifacts that are stored in overlay 140 to determine when the artifact is no longer being accessed. Because overlay-managing write filter 200 is positioned above file-based write filter 110 it will be able to process any requests targeting artifacts of the protected volume. For purposes of step 1b, overlay-managing write filter 200 can monitor for open and close requests and maintain an internal count of opened handles based on such requests.

It is noted that not all open and close requests that overlay-managing write filter 200 will receive will pertain to an artifact stored in overlay 140. For example, a request to open a file for reading will open the file directly from the protected volume such that the file will not be stored in overlay 140. In contrast, a request to write to a file will be redirected to overlay 140. In such cases, overlay-managing write filter 200 can begin tracking the number of open handles to the file that has been added to overlay 140. Accordingly, step 1b can include monitoring I/O requests to determine which artifacts are (or will be) stored in overlay 140 as well as to determine when no more handles are open to the artifact. In general, overlay-managing write filter 200 can be configured to increment an open file handle count for a particular artifact whenever a request to open the particular artifact is received and to decrement the open file handle count for the particular artifact whenever a request to close the particular artifact is received. In this context, a request to open an artifact should be construed as including any of the various functions that involve obtaining a handle to an artifact (e.g., OpenFile, ReadFile, WriteFile, CreateFile, etc.). Likewise, a request to close an artifact should be construed as including any of the various functions that involve releasing a handle to an artifact (e.g., CloseHandle).

In some embodiments, a hybrid of steps 1a and 1b could be employed. For example, overlay-managing write filter 200 could employ functions of the FBWF API to determine which artifacts are stored in overlay 140 and can then monitor for I/O requests that pertain to these artifacts. Accordingly, overlay-managing write filter 200 can employ various different techniques for determining when an artifact stored in overlay 140 is no longer being accessed, and the present invention should not be limited to any particular technique.

In some embodiments, regardless of which technique is employed to determine when an artifact is no longer being accessed, overlay-managing write filter 200 may track how much time has elapsed since the last handle to the artifact was closed. For example, in the context of step 1a, overlay-managing write filter 200 may store a timestamp representing when it determined that the openHandleCount member in the FbwfCacheDetail structure for a particular artifact was 0. Similarly, in the context of step 1b, overlay-managing write filter 200 may store a timestamp representing when an I/O request that closed the last handle to a particular artifact was received. Overlay-managing write filter 200 could use such timestamps to determine which artifacts to move to overlay cache 240 as will be described below (e.g., overlay-managing write filter 200 may move artifacts that have not been accessed for the longest amount of time).

Figure 4B:
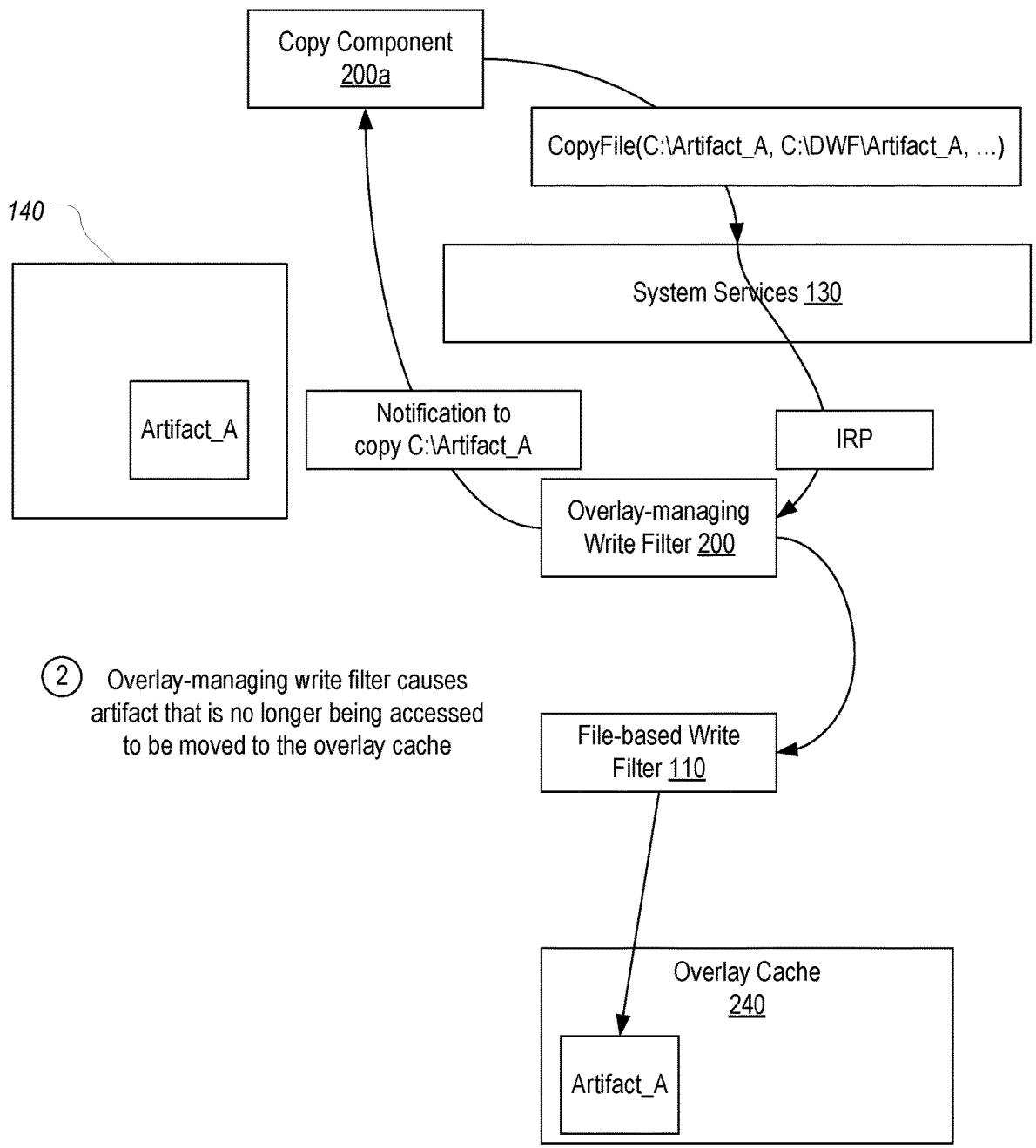
Figure 4C:
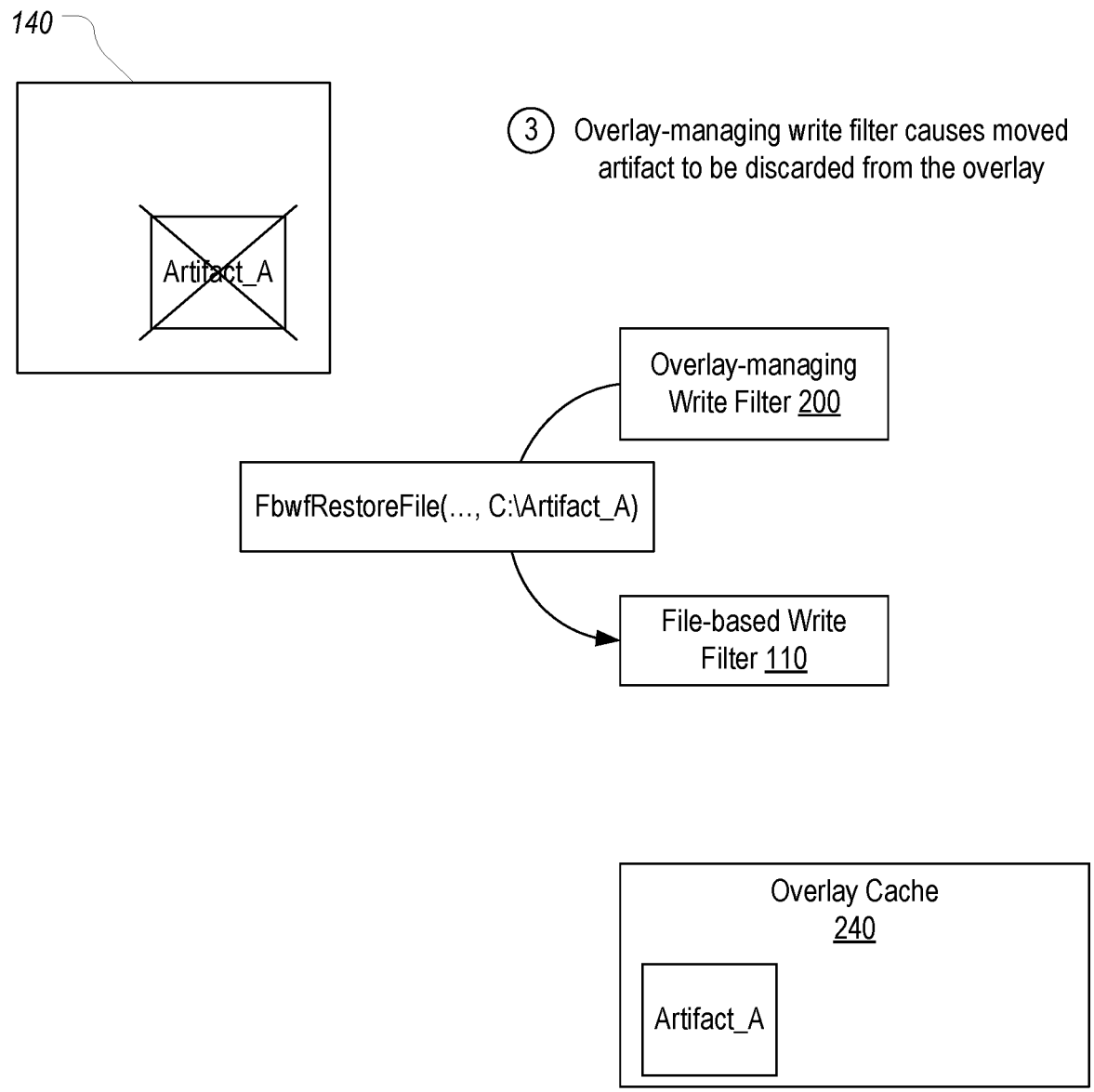

Turning now to FIG. 4B, because it has determined that Artifact_A in overlay 140 is no longer being used, overlay-managing write filter 200 can cause Artifact_A to be moved from overlay 140 to overlay cache 240 in step 2. As indicated above, overlay cache 240 can be a portion of the protected volume for which an exclusion has been registered with file-based write filter 110 such that file-based write filter 110 will not block requests to create artifacts in overlay cache 240. It is noted, however, that overlay cache 240 could be implemented in a separate volume in other embodiments (e.g., in a separate partition or separate storage device).

Different techniques could be employed to cause Artifact_A to be stored in overlay cache 240. For example, in FIG. 4B, overlay-managing write filter 200 is shown as employing copy component 200a, which can be a user mode service, to perform a copy. In particular, overlay-managing write filter 200, which would typically be a kernel mode filter driver, could notify copy component 200a (e.g., by means of raising an event for which a thread of copy component 200a is monitoring) that Artifact_A should be copied. Such a notification can identify the artifact to be copied (e.g., C:\Artifact_A assuming Artifact_A is stored at the C:\ location on the protected volume). In some cases, if multiple storage locations exist within overlay cache 240, overlay-managing write filter 200 may also include a particular location within this notification. In the present example, it will be assumed that overlay cache 240 includes a single folder, C:\DWF, on the protected volume and therefore copy component 200a can assume that all artifacts should be copied to this single folder.

FIG. 4B further shows that copy component 200a may respond to the notification by issuing an I/O request to copy C:\Artifact_A to C:\DWF\Artifact_A. System services 130 in conjunction with I/O manager 120 will create an IRP to represent this copy request and pass the IRP down the device stack. This can include providing the IRP to overlay-managing write filter 200 which can allow the IRP to pass onto file-based write filter 110. File-based write filter 200 can handle the IRP in a standard manner which would include determining that C:\Artifact_A is actually stored in overlay 140 and that C:\DWF is included in the exclusion list such that the copy can be made to the protected volume rather than to overlay 140. As a result, the version of Artifact_A that is stored in overlay 140 will be copied to disk 100 at C:\DWF\Artifact_A.

In current implementations of file-based write filter 110, only modified portions of an artifact will be stored in overlay 140. However, even if only a portion of an artifact is stored in overlay 140, the request to copy the artifact will result in a copy of the entire file with the modifications being made in overlay cache 240. Therefore, in FIG. 4B, Artifact_A in overlay cache 240 will represent an entire artifact while Artifact_A in overlay 140 may represent a portion of an artifact or an entire artifact.

Although not shown, other techniques for copying Artifact_A to overlay cache 240 can include overlay-managing write filter 200 obtaining a copy of Artifact_A directly from overlay 140 and then passing an IRP to file-based write filter 110 that requests the creation of Artifact_A at C:\DWF. In such a case, if overlay 140 only stores a modified portion of Artifact_A, it may be necessary for overlay-managing write filter 200 to obtain the unmodified portions of Artifact_A from the protected volume and then merge the portions to form a complete modified version of the artifact in overlay cache 240. Any other available technique by which a user mode or kernel mode component may access an artifact in overlay 140 may also be used.

After step 2, Artifact_A will exist in overlay cache 240, but will also still exist in overlay 140. In order to free up overlay 140, overlay-managing write filter 200 (or copy component 200a) can be configured to request that Artifact_A be discarded from overlay 140 as is represented in step 3 in FIG. 4C. As shown, step 3 can be accomplished by calling the FbwfRestoreFile function (which is part of the File Based Write Filter API that provides access to functions of the Windows File Based Write Filter) and specifying C:\Artifact_A as input. Of course, another equivalent function could be called. The calling of the FbwfRestoreFile function can occur in different ways. For example, overlay-managing write filter 200 may call this function in conjunction with notifying copy component 200a to copy Artifact_A to overlay cache 240, in response to receiving the IRP that copies Artifact_A to overlay cache 240, or in response to being notified by copy component 200a that the copy has completed successfully. Alternatively, copy component 200a could be configured to call FbwfRestoreFile in conjunction with requesting that Artifact_A be copied to overlay cache 240 such as in response to receiving confirmation that the copy completed successfully. In any case, regardless of which component calls FbwfRestoreFile and when FbwfRestoreFile is called, file-based write filter 110 will respond to the call by deleting Artifact_A from overlay 140 effectively reducing the size of overlay 140. It is important to note, however, that the modified version of Artifact_A will continue to exist in overlay cache 240 and therefore the modified version will not be lost.

Figure 4D:
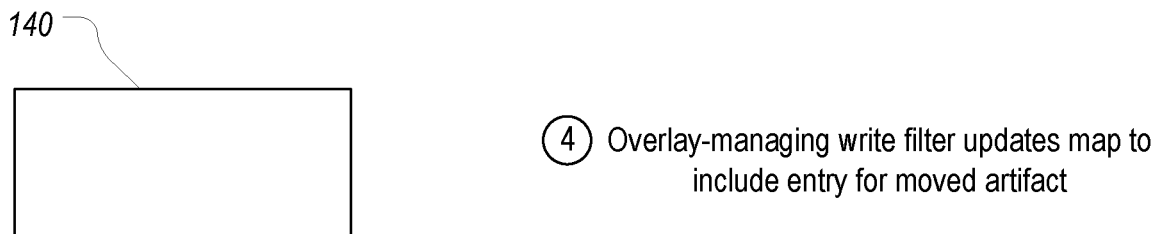
Figure 4D:
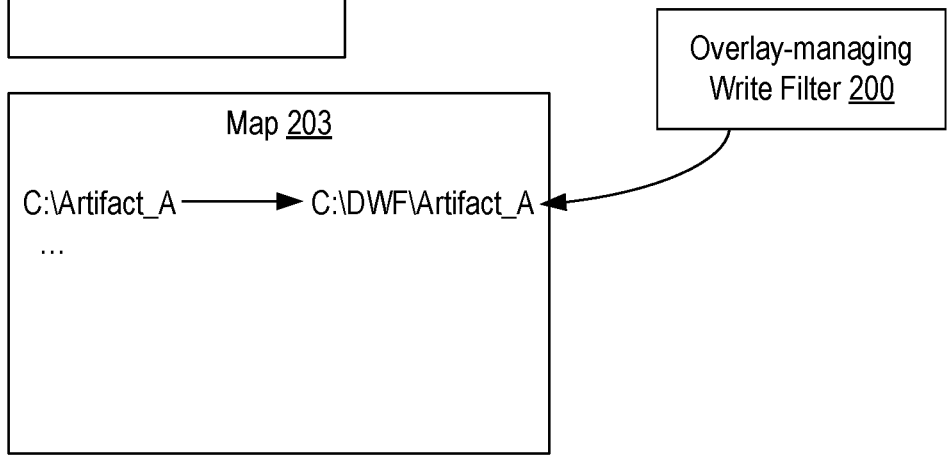
Figure 4D:
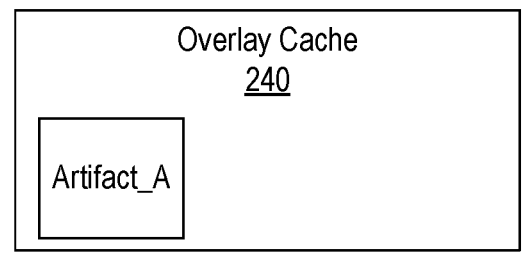

With Artifact_A discarded from overlay 140, file-based write filter 110 will assume that a modified version of Artifact_A no longer exists and therefore any request to access Artifact_A should result in the original version of Artifact_A being read from the protected volume. However, in accordance with the techniques of the present invention, overlay-managing write filter 200 can prevent file-based write filter 110 from accessing the original version of Artifact_A (at least until the system is rebooted). FIG. 4D represents how this can be accomplished. As shown, in step 4 and in conjunction with Artifact_A being successfully copied to overlay cache 240, overlay-managing write filter 200 can add an entry to map 203 that identifies that Artifact_A has been moved to overlay cache 240. In essence, map 203 can map the location of the original artifact to the location of the modified artifact in the overlay cache 240.

Figure 4E:
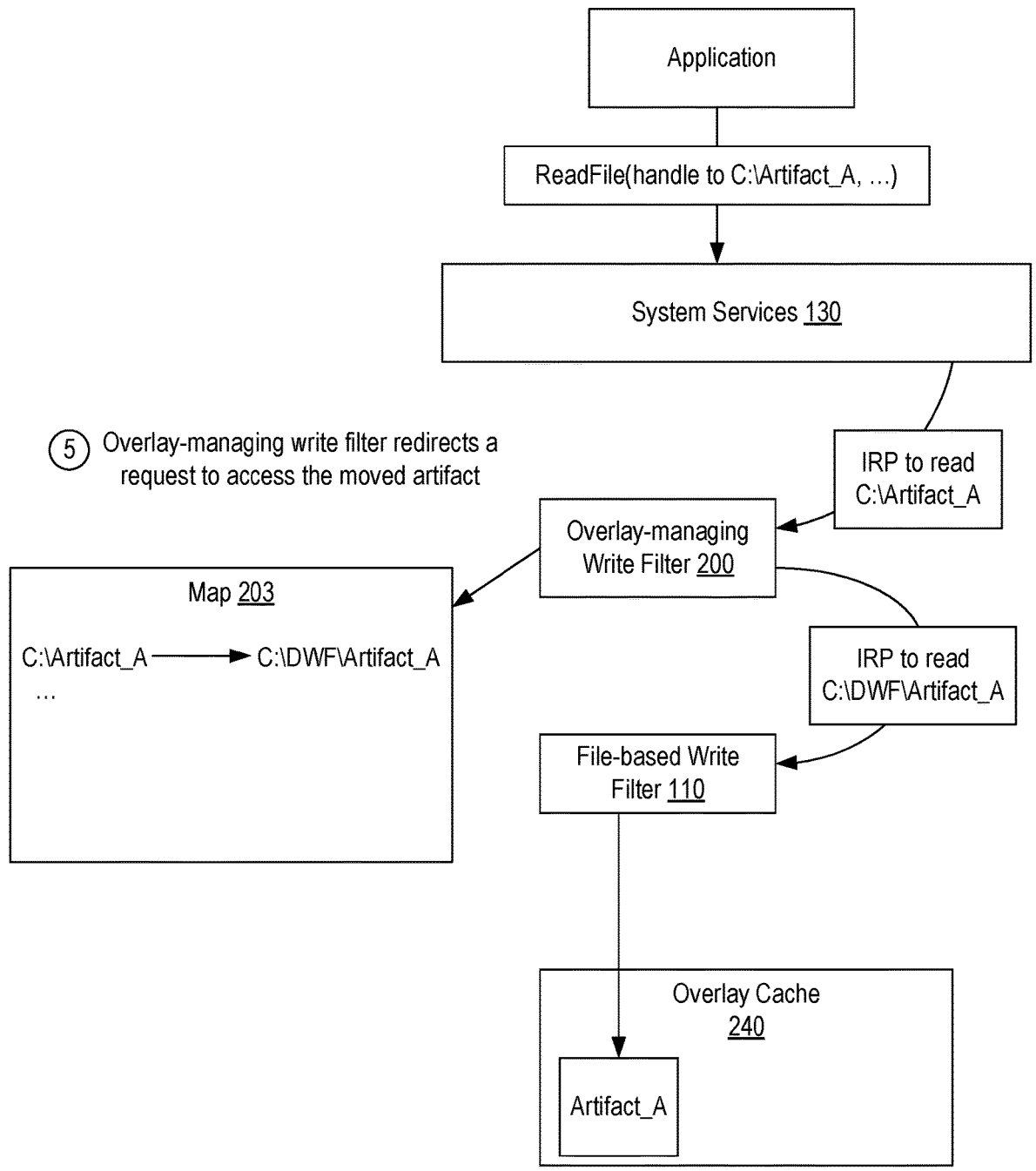

FIG. 4E illustrates how overlay-managing write filter 200 can employ map 203 to redirect a request to access an artifact that has been moved from overlay 140 to overlay cache 240. In this figure, it will be assumed that an application issues an I/O request to read C:\Artifact_A which will result in an IRP representing this read being passed to overlay-managing write filter 200. Upon receiving this IRP (or any other IRP), overlay-managing write filter 200 can evaluate the target of the IRP against the contents of map 203 to determine whether the targeted artifact has been moved to overlay cache 240. In this example, map 203 includes an entry for C:\Artifact_A and therefore overlay-managing write filter 200 can redirect the IRP in step 5 by changing the target of the IRP to C:\DWF\Artifact_A (i.e., to the location of the moved artifact in overlay cache 240). The modified IRP can then be passed down to file-based write filter 110 which, due to the fact that it is a read request, will direct the request to overlay cache 240. As a result, the requesting application will receive the modified version of Artifact_A. It is noted that if overlay-managing write filter 200 did not modify the IRP, file-based write filter 110 would have caused the original version of Artifact_A to be retrieved from its C:\ location effectively causing the modifications to Artifact_A to appear as if they had been lost. Although not shown, as the IRP travels back up the stack, overlay-managing write filter 200 can again modify the IRP to change the target from C:\DWF\Artifact_A back to C:\Artifact_A. This will hide the fact that overlay-managing write filter 200 has redirected the request.

Figure 4F:
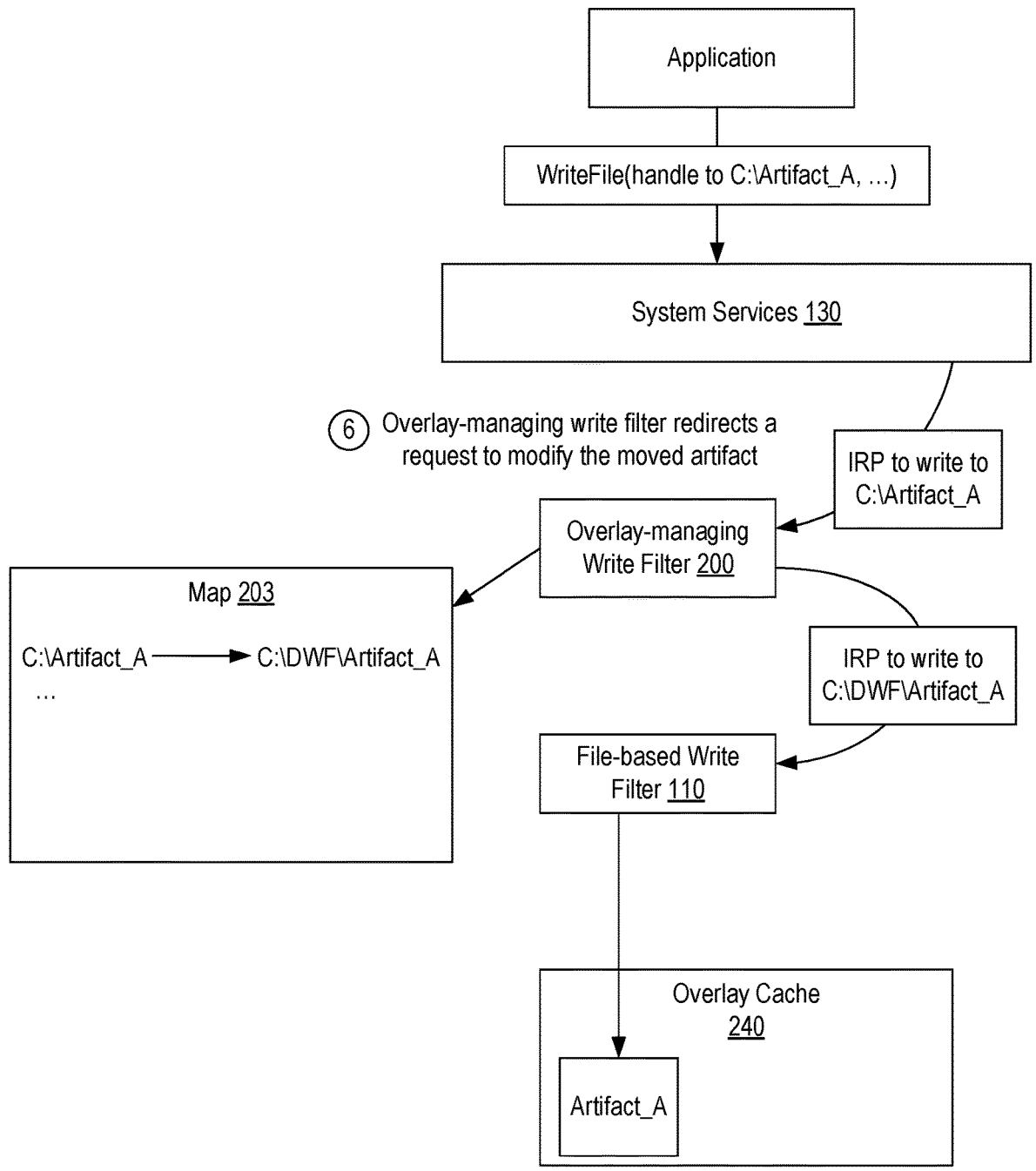

If the I/O request targeting C:\Artifact_A had instead been a request to modify Artifact_A, overlay-managing write filter 200 would have performed a similar process. FIG. 4F represents this scenario. In the same manner described above, overlay-managing write filter 200 can employ map 203 to redirect an IRP that attempts to modify C:\Artifact_A so that it targets C:\DWF\Artifact_A rather than C:\Artifact_A in step 6. Because overlay cache 240 is on the exclusion list, file-based write filter 110 will allow the write to be made to C:\DWF\Artifact_A.

As indicated above, in some embodiments, an artifact can be labeled as "not currently being accessed" only after a specified amount of time has elapsed since the last handle to the artifact was closed. By employing this "wait period," overlay-managing write filter 200 will likely reduce the number of times that I/O requests will need to be redirected to overlay cache 240. Also, in some embodiments, overlay-managing write filter 200 may only commence moving artifacts to overlay cache 240 after the size of overlay 140 has reached some defined threshold. In other words, overlay-managing write filter 200 may forgo moving artifacts to overlay cache 240 while overlay 140 is relatively small. In some embodiments, this threshold can be dynamically determined based on memory utilization. For example, if substantial memory resources are available, overlay-managing write filter 200 may allow overlay 140 to continue to grow without starting to move non-accessed artifacts to overlay cache 240.

In the case that the system is shutdown, overlay-managing write filter 200 can be configured to discard all artifacts in overlay cache 240 and delete map 203 as part of the shutdown or subsequent reboot process. This will ensure that the protected volume will be returned to its original condition once the system is rebooted.

Figure 5:
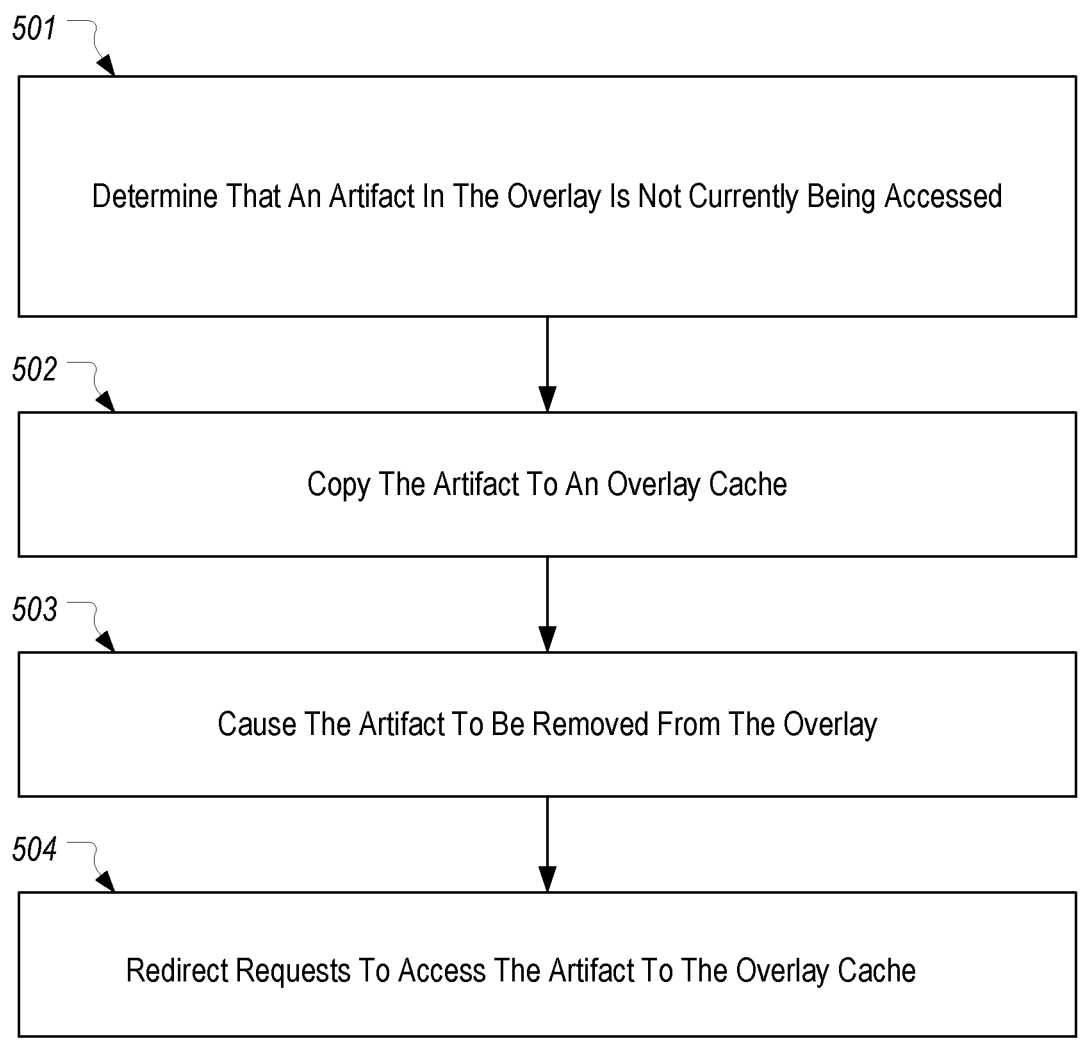
FIG. 5 provides a flowchart of an example method for freeing up an overlay of a file-based write filter.

FIG. 5 provides a flowchart of an example method 500 for freeing up an overlay of a file-based write filter. Method 500 can be implemented by overlay-managing write filter 200 in a system that includes file-based write filter 110.

Method 500 includes an act 501 of determining that an artifact in the overlay is not currently being accessed. For example, overlay-managing write filter 200 can monitor requests to open and close the artifact or can employ functionality of the file-based write filter to identify when no handles to the artifact are open.

Method 500 includes an act 502 of copying the artifact to an overlay cache. For example, overlay-managing write filter 200 can generate an I/O request to copy the artifact in the overlay to the overlay cache.

Method 500 includes an act 503 of causing the artifact to be removed from the overlay. For example, overlay-managing write filter 200 can call a function of the file-based write filter that will cause the file-based write filter to discard the artifact from the overlay.

Method 500 includes an act 504 of redirecting requests to access the artifact to the overlay cache. For example, overlay-managing write filter 200 can monitor for I/O requests that target the artifact at its permanent location on the protected volume and modify such requests so that they target the artifact in the overlay cache.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an overlay-managing write filter, for freeing up an overlay of a file-based write filter using an overlay cache, the file-based write filter employing the overlay to protect a protected volume from modification, the method comprising:

identifying that an artifact that exists on the protected volume at a first file system location has been stored in the overlay of the file-based write filter as a result of the artifact being modified;

determining that the artifact stored in the overlay of the file-based write filter is not currently being accessed;

in response to determining that the artifact stored in the overlay of the file-based write filter is not currently being accessed, issuing a request to copy the artifact to a second file system location that is in an overlay cache;

in conjunction with issuing the request to copy the artifact to the second file system location that is in the overlay cache, updating a map to associate the first file system location with the second file system location;

in conjunction with issuing the request to copy the artifact to the second file system location that is in the overlay cache, issuing a request to the file-based write filter to cause the artifact to be removed from the overlay;

after the artifact has been copied to the second file system location that is in the overlay cache and after the artifact has been removed from the overlay, receiving an I/O request that targets the artifact at the first file system location; and employing the map to redirect the I/O request to target the artifact at the second file system location such that the I/O request will cause the copy of the artifact in the overlay cache to be accessed.

2. The method of claim 1, wherein determining that the artifact that is stored in the overlay is not currently being accessed comprises determining that no handles to the artifact are open.

3. The method of claim 2, wherein determining that no handles to the artifact are open comprises monitoring requests to open and close the artifact.

4. The method of claim 2, wherein determining that no handles to the artifact are open comprises employing a function of the file-based write filter that identifies a number of open handles to the artifact.

5. The method of claim 1, wherein the overlay cache is implemented on a separate volume.

6. The method of claim 1, wherein a user mode component issues the request to copy the artifact in response to a notification received from a kernel-mode filter driver.

7. The method of claim 1, wherein determining that the artifact stored in the overlay of the file-based write filter is not currently being accessed comprises:

determining that a specified amount of time has elapsed since a last handle to the artifact was closed.

8. The method of claim 1, further comprising:

determining that a size of the overlay has reached a defined threshold, wherein the overlay-managing write filter identifies that the artifact that exists on the protected volume at the first file system location has been stored in the overlay of the file-based write filter as a result of the artifact being modified after determining that the size of the overlay has reached the defined threshold.

9. The method of claim 1, wherein the overlay-managing write filter issues the request to the file-based write filter to cause the artifact to be removed from the overlay in response to the artifact being copied to the second file system location that is in the overlay cache.

10. The method of claim 1, wherein the overlay cache is a portion of the protected volume for which an exclusion has been registered with the file-based write filter.

11. The method of claim 8 wherein the defined threshold is dynamically determined.

12. The method of claim 1, further comprising:
in conjunction with a system shutdown or reboot, deleting all artifacts that have been copied to the overlay cache.

13. One or more computer storage media storing computer-executable instructions which when executed implement an overlay-managing write filter that is configured to be loaded in a device stack pertaining to a protected volume above a file-based write filter that protects artifacts of the protected volume, the overlay-managing write filter being further configured to:
identify that an artifact that exists on the protected volume at a first file system location has been stored in an overlay of the file-based write filter as a result of the artifact being modified;
determine that the artifact stored in the overlay of the file-based write filter is not currently being accessed;
in response to determining that the artifact stored in the overlay of the file-based write filter is not currently being accessed, issue a request to copy the artifact to a second file system location that is in an overlay cache;
in conjunction with issuing the request to copy the artifact to the second file system location that is in the overlay cache, update a map to associate the first file system location with the second file system location;
in conjunction with issuing the request to copy the artifact to the second file system location that is in the overlay cache, issue a request to the file-based write filter to cause the artifact to be removed from the overlay;
after the artifact has been copied to the second file system location that is in the overlay cache and after the artifact has been removed from the overlay, receive an I/O request that targets the artifact at the first file system location; and
employ the map to redirect the I/O request to target the artifact at the second file system location such that the I/O request will cause the copy of the artifact in the overlay cache to be accessed.

14. The computer storage media of claim 13, wherein the overlay-managing write filter includes a user-mode component that issues the request to copy the artifact to the second file system location that is in the overlay cache in response to receiving a notification from a kernel-mode component of the overlay-managing write filter.

15. The computer storage media of claim 13, wherein determining that the artifact that is stored in the overlay is not currently being accessed comprises determining that no handles to the artifact are open.

16. The computer storage media of claim 13, wherein determining that the artifact stored in the overlay of the file-based write filter is not currently being accessed comprises:
determining that a specified amount of time has elapsed since a last handle to the artifact was closed.

17. The computer storage media of claim 13, wherein the overlay cache is implemented on a separate volume.

18. The computer storage media of claim 13, wherein the overlay cache is maintained on the protected volume.

19. The computer storage media of claim 13, wherein the overlay-managing write filter is further configured to:
determine that a size of the overlay has reached a defined threshold;
wherein the overlay-managing write filter identifies that the artifact that exists on the protected volume at the first file system location has been stored in the overlay of the file-based write filter as a result of the artifact being modified after determining that the size of the overlay has reached the defined threshold.

20. A method, performed by an overlay-managing write filter, for managing an overlay of a file-based write filter using an overlay cache, the file-based write filter employing the overlay to protect a protected volume from modification, the method comprising:
monitoring a size of the overlay;
determining that the size of the overlay has reached a defined threshold;
in response to determining that the size of the overlay has reached the defined threshold, freeing up the overlay by performing the following for each of a plurality of artifacts:
identifying that the artifact that exists on the protected volume at a first file system location has been stored in the overlay of the file-based write filter as a result of the artifact being modified;
determining that the artifact stored in the overlay of the file-based write filter is not currently being accessed;
in response to determining that the artifact stored in the overlay of the file-based write filter is not currently being accessed, issuing a request to copy the artifact to a second file system location that is in an overlay cache;
in conjunction with issuing the request to copy the artifact to the second file system location that is in the overlay cache, issuing a request to the file-based write filter to cause the artifact to be removed from the overlay;
after the artifact has been copied to the second file system location that is in the overlay cache and after the artifact has been removed from the overlay, receiving an I/O request that targets the artifact at the first file system location; and
redirecting the I/O request to target the artifact at the second file system location such that the I/O request will cause the copy of the artifact in the overlay cache to be accessed.

* * * * *